Figure 1:
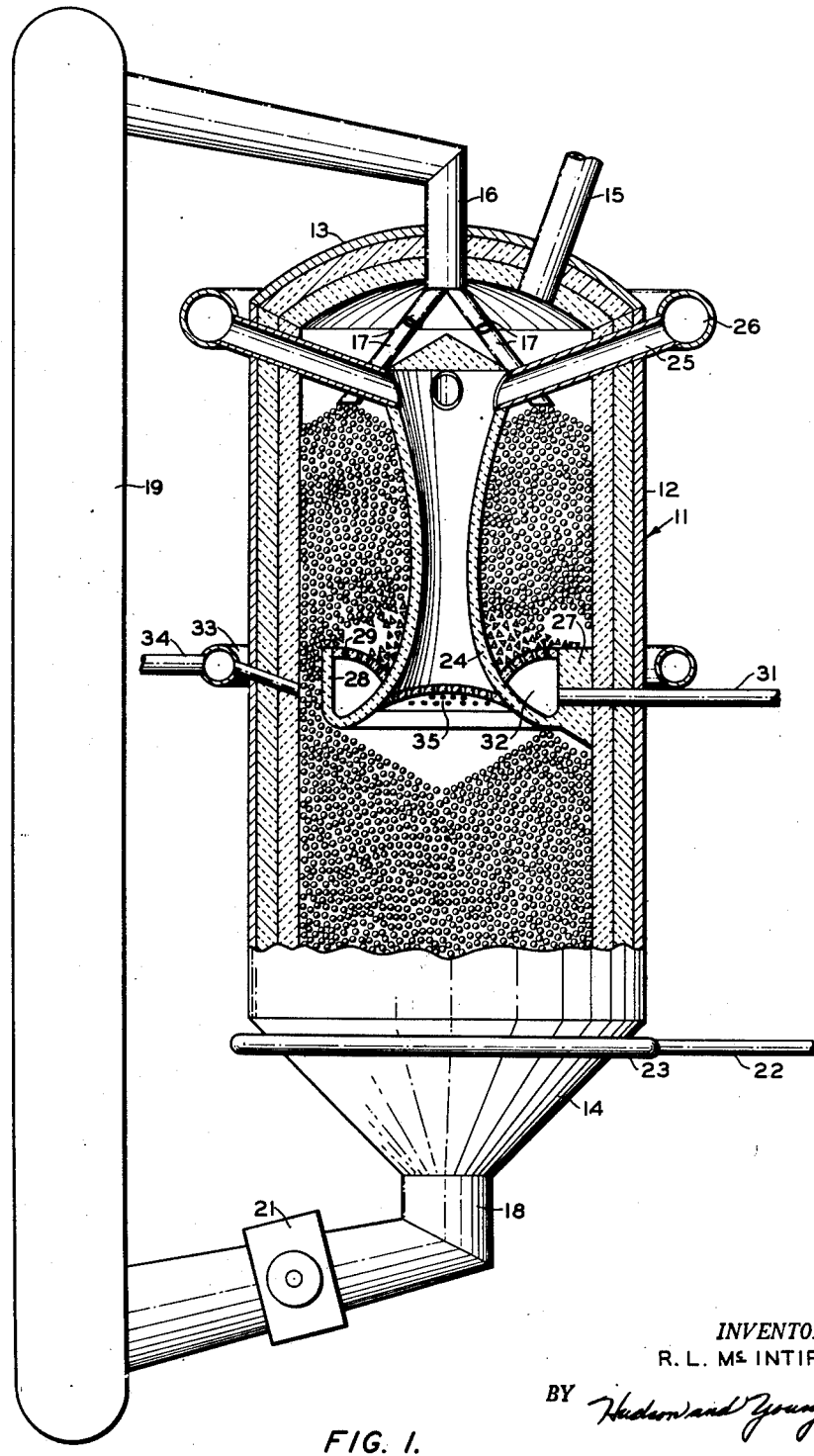

March 30, 1954

R. L. McINTIRE 2,673,791

PEBBLE HEATER

Filed Jan. 2, 1951

2 Sheets-Sheet 2

*INVENTOR.*
R. L. McINTIRE

BY *Hudson Ward Young*

*ATTORNEYS*

Patented Mar. 30, 1954

2,673,791

UNITED STATES PATENT OFFICE 2,673,791

PEBBLE HEATER

Robert L. McIntire, Bartlesville, Okla., assignor to Phillips Petroleum Company, a corporation of Delaware Application January 2, 1951, Serial No. 203,925

7 Claims. (Cl. 23—284)

This invention relates to the conversion of hydrocarbons. In one of its more specific aspects, it relates to the conversion of hydrocarbons in pebble heater apparatus. In another of its more specific aspects it relates to improved pebble heater apparatus for the conversion of hydrocarbons. In another of its more specific aspects it relates to a means and method for evenly distributing reactant material throughout a pebble conversion chamber.

Thermal conversion processes which are carried out in so-called pebble heater apparatus utilize a flowing mass of solid heat exchange material, which mass is heated to a high temperature by passing hot gas therethrough in a first direct heat exchange step and is then caused to contact gaseous reactant materials, furnishing heat thereto in a second direct heat exchange. The conventional pebble heater apparatus generally comprises two chambers which may be disposed in substantially vertical alignment. The solid heat exchange material is introduced into the upper portion of the first chamber. That material forms a gravitating bed of solid heat exchange material which flows downwardly through the chamber in direct heat exchange with hot gaseous heat exchange material. The solid heat exchange material is heated to a high temperature in the heat exchange and is then gravitated to a second chamber in which the hot solid heat exchange material is caused to contact gaseous reactant materials in a second direct heat exchange relation furnishing heat for the treatment or conversion of the gaseous materials.

Conventional pebble heater chambers of pebble heater apparatus are generally formed as cylinders in which a solid heat exchange material is collected in the form of a moving bed. Hot heat exchange gases are sometimes introduced into the cylindrical bed at the periphery of its lower end portion and are sometimes introduced through a refractory arch which supports the moving pebble bed. The solid heat exchange material is drawn from substantially a central point in the bottom of the bed and is passed downwardly into a gas heating chamber where a second moving bed of solid heat exchange material is formed.

One disadvantage in the operation of conventional pebble reaction chambers is that it is most difficult to establish uniform flow of reactant materials in contact with uniformly heated pebbles from the pebble heater chamber. In the withdrawal of solid heat exchange material from a substantially central point in the bottom of a pebble reaction chamber, the moving solid heat exchange material tends to form an inverted cone. That material which is below and outside of the cone remains in what is substantially a stagnant area. At the same time when solid heat exchange material is introduced centrally into the upper portion of the pebble reaction chamber, the top of the solid heat exchange material forms a cone extending downwardly and outwardly from the solid material inlet in the top of the chamber. It will thus be seen that the gravitating pebble bed is of lesser thickness at its periphery than at its axis because of the fact that the top and bottom of the bed are in the shapes of cones.

Reactant materials which are introduced into the reaction chamber are raised to conversion temperature by direct heat exchange with the hot solid heat exchange material in the reaction chamber and resulting reaction products are removed from the upper portion of the reaction chamber. It has heretofore been thought that the gaseous material which flows upwardly through the gravitating bed of solid heat exchange material within the reaction chamber tends to follow the path of least resistance. That path of least resistance is along the periphery of the gravitating solid material bed inasmuch as the bed is thinner at its periphery than at its axis. A large portion of the non-uniform gas flow through a reaction chamber, however, is due to the fact that gases tend to flow toward cool areas and the peripheral portion of the reaction chamber is the coolest area of the gravitating solid material bed within the reaction chamber. The gases are caused to expand in the hot areas of the reaction chamber and contract in the cooler areas of that chamber. Thus flow of gaseous material to the cooler areas results.

There are several reasons why the peripheral portion of the solid material bed is cooler than the axial portion thereof. It has been known for some time that when a central solid material outlet is used, solid materials flowing through the central portion of the reaction chamber gravitate more rapidly than do the solid materials in the peripheral portion of the bed unless gravitation in that axial portion is retarded by some flow control means, such as baffles, or the like. Thus the solid materials flowing through the central portion of the bed normally have less contact time with the gaseous materials in the reaction chamber and give up less of their heat to those materials than do solid materials flowing at a lower flow rate. On the other hand, the solid heat exchange material flowing through the peripheral portion of the solid heat exchange material bed is caused to contact gaseous material for a longer period of time by reason of its lower flow rate, thus giving up greater amounts of heat to the reactant and product materials. As the peripheral portion of the solid material contact bed gives up greater amounts of heat, that portion of the bed is cooled, thus attracting greater amounts of gaseous materials by reason of contraction of those gases which in turn gain additional heat from the solid heat exchange material, lowering the temperature of that solid material still further. Still another reason for non-uniform solid material temperature is found in the fact that as solid materials are introduced into the top of the reaction chamber they are caused to contact some gaseous materials while at the peak of the cone of solid material formed at the top of the solid material bed. As the solid material rolls downwardly and outwardly over the top of the solid material bed, the solid material contacts even more of the gaseous materials, giving up heat thereto. Thus, as the solid material finally reaches the periphery of the solid material bed it has given up much more heat to gaseous material than has solid material which remains as an axial portion of the solid material bed.

Solid heat exchange material which can be utilized in the pebble heater of this invention is the same as that set forth in Quigg Patent 2,505,257, granted April 25, 1950.

An object of this invention is to provide improved pebble heater apparatus. Another object of the invention is to provide an improved means for obtaining more uniform reaction of hydrocarbons in pebble heater apparatus. Another object of the invention is to provide means whereby overcracking of a portion of the hydrocarbon feed and undercracking of another portion of the hydrocarbon feed to the pebble heater apparatus is substantially overcome. Another object of the invention is to provide an improved single chamber pebble heater apparatus. Other and further objects and advantages will be apparent to those skilled in the art upon study of the accompanying discussion and the drawings.

Broadly speaking, this invention comprises a means and method for removing all gaseous effluent from the reaction chamber of pebble heater apparatus in a very closely intermingled state and under such conditions that unreacted hydrocarbon materials are subjected to the highest temperatures available in the reaction chamber and the converted hydrocarbon materials are subjected to the quenching action of the unconverted materials. This mixing of the gaseous effluent from the reaction chamber is obtained by providing a Venturi-type member in the upper portion of the reaction chamber and causing that Venturi-type member to be surrounded by pebbles which are at a higher temperature than those temperatures encountered in lower planes in the reaction chamber. All of the effluent gases from the reaction chamber are withdrawn through the Venturi-type member and the various portions of gaseous effluent are intimately mixed in the Venturi-type member before removal from the pebble heater apparatus. The hot pebbles which surround the Venturi-type member provide heat for further reaction of unreacted materials by indirect heat exchange with the gaseous effluent through the wall of the Venturi-type member.

Figure 2:
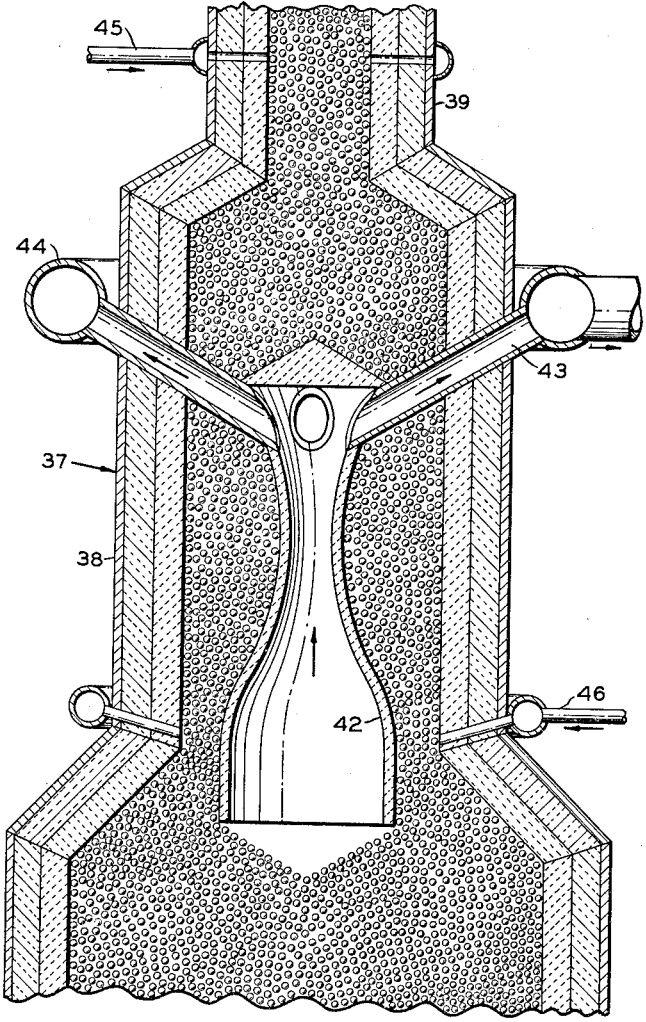
Figure 3:
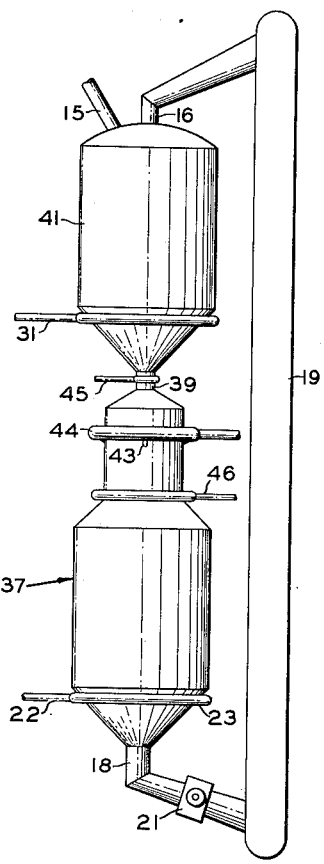

Better understanding of the invention will be obtained upon reference to the diagrammatic drawings in which Figure 1 is an elevational schematic representation in section of a preferred form of the pebble heater apparatus of this invention. Figure 2 is a sectional elevation of a modification of the reaction chamber of pebble heater apparatus of this invention. Figure 3 is an elevational representation of pebble heater apparatus which is provided for complete recycle of pebbles from the lower chamber of the apparatus to the upper chamber thereof.

Referring particularly to the device shown in Figure 1 of the drawings, pebble heater apparatus 11 comprises a single chamber apparatus. Pebble heater apparatus 11 comprises an upright elongated shell 12 which is closed at its upper and lower ends by closure members 13 and 14, respectively. Effluent outlet conduit 15 is provided in the upper portion of apparatus 11, preferably in closure member 13. Pebble inlet conduit 16 extends into the upper portion of shell 12, preferably through a central point in closure member 13 and is split into a plurality of pebble outlet conduits 17 which extend to points intermediate the longitudinal axis of shell 12 and the periphery thereof. Pebble outlet conduit 18 extends from the bottom portion of apparatus 11, preferably from a central point in closure member 14. Elevator 19 is connected at its lower end to the lower end portion of pebble outlet conduit 18 and is connected at its upper end to the upper end portion of pebble inlet conduit 16. Pebble flow controller 21 is provided intermediate the ends of pebble outlet conduit 18 and may be any conventional type solid material flow controller, such as a rotary table feeder, a vibratory feeder, a star valve, a gate valve, or the like. Reactant material inlet conduit 22 is connected to the lower end portion of shell 12, preferably encircling at least a portion of closure member 14 as header member 23 and communicates with the interior of shell 12 through the wall thereof.

An elongated Venturi-type member 24, considerably smaller in diameter than shell 12, is provided within the upper portion of shell 12 and is positioned coaxially therewith so that its upper end portion extends upwardly into the upper portion of the chamber formed within shell 12 so as to extend above the level of the pebble bed formed within shell 12, the pebbles being introduced thereinto through inlet conduits 16 and 17. Effluent outlet conduits 25 extend upwardly and outwardly from the upper end portion of Venturi-type member 24 and from a level above that of the outlet ends of conduits 17 so as to provide the sole outlet for gaseous materials from the upper end portion of Venturi member 24. Conduits 25 are connected at their outer ends to outlet header 26 which may be provided with quench means, not shown. The lower end portion of Venturi-type member 24 extends downwardly into a central portion of the chamber formed within shell 12. Venturi-type member 24 is supported within shell 12 by at least two extensions 27 which extend to the insulated wall of shell 12. The lower end of Venturi-type member 24 extends outwardly and upwardly, preferably parallel to the wall of shell 12, and except for support extensions 27 provides an annular space for the free flow of pebbles between the upwardly extending extension 28 and the wall of shell 12. Venturi-type member 24 is preferably of such diameter that upright extensions 28 are spaced from the wall of shell 12 by at least eight pebble diameters. It is preferred to maintain a clearance between the smallest cross-section of member 24 and the wall of shell 12 of at least twenty-five pebble diameters. A perforate annular arch 29 is provided so as to extend between the upright extensions 28 of member 24 and the wall proper of member 24. Perforations are uniformly distributed over the surface of arch 29 so as to provide uniform escape of fluid materials from the chamber enclosed between the Venturi-type member 24 and arch 29. Inlet conduit 31 extends from a heating material supply source, not shown, to the chamber formed between perforate arch 29 and member 24. This chamber designated by numeral 32 serves as a distribution chamber for heating material introduced through conduit 31. Header member 33 encircles at least a portion of shell 12 and communicates with the chamber formed by shell 12 at points adjacent upright extensions 28. Header member 33 is connected to a sealing gas supply source, not shown, through conduit 34. A perforate baffle 35 is provided in the lower end of Venturi member 24 to prevent entrainment of pebbles through the venturi.

In the operation of the device shown as Figure 1 of the drawings, pebbles are introduced into the upper portion of the chamber formed within shell 12 through inlet conduits 16 and 17. The pebbles gravitate downwardly through those conduits and form a contiguous pebble mass within shell 12 and around Venturi-type member 24. The pebbles gravitate downwardly over arch 29 and through the broken annulus formed between upright extensions 28 and the wall of shell 12 and form a gravitating mass below Venturi-type member 24. The gravitating pebbles are withdrawn from the chamber formed within shell 12 through pebble outlet conduit 18, the gravitation thereof being controlled by flow controller 21. The gravitating pebbles are elevated from conduit 18 to the inlet end of conduit 16 by elevator 19 which may be a mechanical bucket-type elevator, a helical screw-type elevator, or a gas lift.

Heating material is introduced through conduit 31 into annular chamber 32 and is distributed therein for uniform introduction into the pebble mass thereabove through perforate arch 29. The heating material may be a hot combustion gas obtained by combustion of fuel and air at a point outside of chamber 32 or may be a mixture of fuel and air introduced into chamber 32 for subsequent combustion. It is within the scope of this invention to burn the fuel-air mixture within chamber 32 for subsequent introduction into the pebble mass above arch 29 or the fuel-air mixture may be introduced through arch 29 into the presence of the pebbles and burned on the surface of the pebbles. In any event, heat is transferred by direct heat exchange between the heating material and the pebbles above perforate arch 29. The hot gases pass upwardly through the annular pebble mass formed between Venturi member 24 and shell 12 until they escape from the upper surface of that gravitating pebble bed. The heating gases are thereupon removed from the upper portion of apparatus 11 through gaseous effluent outlet 15.

The gravitating pebbles are heated within the annular portion of the pebble bed to a temperature generally within the range of between 1200° F. and 3400° F., depending upon the reaction products desired from the conversion carried on within the reaction chamber portion of the apparatus. The reaction chamber portion of the apparatus is that portion disposed below the Venturi-type member 24. Temperatures within the range of between 1000° F. and 1800° F. are normally used for the conversion of hydrocarbon oils to form normally liquid olefins and aromatic hydrocarbon fractions such as gasoline and the like. Temperatures within the range of between 1600° F. and 3000° F. are utilized for converting normally gaseous materials, such as ethane to ethylene, acetylene, or the like. The temperature to which the pebbles are heated within the pebble heater chamber portion of the apparatus, i. e., that portion above the level of perforate arch 29, is normally between 100 and 200° F. above the reaction temperature desired in the reaction chamber portion of the apparatus. The pebbles which have been heated to the desired temperature are gravitated as heretofore described through the broken annulus formed between upright extension 28 and the wall of shell 12 into the reaction chamber portion of the apparatus.

Reactant materials generally in gaseous or vaporous form are introduced through inlet conduit 22 and header member 23 into the lower portion of the reaction chamber portion of the apparatus. The reactant materials are heated in a direct heat exchange with the hot pebbles in that portion of the chamber and pass upwardly through the contiguous pebble mass into Venturi-type member 24. Because of the non-uniform contact between gases and pebbles as described above, a portion of the reactant materials may be undercracked and a portion of the products may be starting to overcrack. By this invention I intimately mix the undercracked reactant materials with the overcracked materials which are at a higher temperature and in this manner effect a substantial quench of the overcracked materials so as to substantially retard the overcracking thereof. The heat which is obtained from the hotter gaseous materials and that which is obtained by the indirect heat exchange with pebbles through the wall of Venturi-type member 24 is sufficient to cause additional cracking of the undercracked reactant material so as to produce an increased conversion of reactant materials to desired products.

It is often important in carrying out reactions in pebble heater operations to see that combustion products from the pebble heater section of the apparatus do not escape into the reaction portion of the apparatus so as to contaminate the products and it is likewise important to see that reaction products do not escape from the reaction portion of the apparatus to the pebble heater portion of the apparatus. For this reason, it is usual practice to introduce an inert gas, such as steam, into the area between the pebble heater section and the reaction section of the apparatus. This inert gas is ordinarily sufficient to prevent the flow of reaction products and combustion products from their respective chamber portions. It has recently been found that when inert gas is introduced into this portion of the pebble heater apparatus at a temperature at which it is ordinarily available, considerable thermal shock of the pebbles results thereby. For that reason, it is very desirable to superheat the inert gas to a temperature which is not more than 500° below that of the pebbles gravitating from the pebble heater section of the apparatus into the reaction section and preferably to superheat the inert gas to a temperature not more than 200° less than the temperature of those pebbles. One method of obtaining steam in such a superheated condition is fully described in U. S. application, Serial No. 202,017, filed December 21, 1950, by H. A. Dutcher.

One problem which exists in the operation of pebble heater apparatus is the entrainment of pebbles in the gaseous stream being removed from the apparatus. For that reason, I have provided the perforate member 35 in the lower end portion of Venturi-type member 24 so as to allow the passage of gaseous materials therethrough but at the same time to prevent the passage of entrained pebbles therethrough. When using some types of feed such a perforate member may be very undesirable for the reason that carbon will tend to form on the surface thereof so as to eventually close off the perforations and thus reduce the efficiency or stop the operation of pebble heater apparatus 11. It has been found that if sufficient space is allowed between the pebble bed and the effluent outlet that the fluidizing effect of the effluent stream will not be sufficient to remove the pebbles from the chamber. In order to provide a sufficient space above the pebble bed below Venturi-type member 24 so that pebbles will be allowed to settle out of the effluent stream, upright extensions 28 may be extended downwardly so as to provide an even greater space between the top of the pebble bed and the restricted portion of the Venturi-type member 24.

In the device shown as Figure 2 of the drawings, reaction chamber 37 comprises an upright elongated shell 38 which is, in one modification, of larger diameter in its lower end portion than in its upper end portion. In one modification, shell 38 can be of uniform diameter. Pebble inlet conduit 39 extends into the upper end portion of the shell 38 and a pebble outlet conduit, shown in Figure 3, extends from the lower end portion of shell 38 to an elevator, which elevator in turn extends to a pebble inlet conduit of a separate pebble heater chamber 41 shown in Figure 3 of the drawings. Venturi-type member 42 is provided within the chamber formed by the smaller diameter section of shell 38 and extends downwardly into the upper end portion of the chamber formed by the larger diameter section of shell 38. Effluent outlet conduits 43 extend outwardly from the upper end portion of Venturi-type member 42 as the sole effluent outlet means from the Venturi member. Conduits 43 are connected at their outer ends to outlet header member 44 which may be provided with quench means, not shown. Conduit 45 extends into the restricted throat 39 for the purpose of introducing an inert gas thereinto such as is introduced through conduit 34 and header member 33 into pebble heater apparatus 11. If desired, inlet conduit 46 may be provided for the introduction of an inert gas into the chamber formed within shell 38 at the lower end portion of the smaller diameter section of that shell. This introduction of inert gas aids in directing reaction products into the lower end portion of Venturi-type member 42. If desired, introduction of inert gas through conduit 46 and sufficient inert gas may be introduced through conduit 45 to cause the positive flow of inert gas downwardly through the pebble mass into the larger diameter portion of the reaction chamber.

Referring particularly to the operation of the device shown in Figure 3 of the drawings, pebbles are introduced into the upper portion of pebble heater chamber 41 through pebble inlet conduit 16 in the upper end portion thereof. The pebbles are gravitated downwardly through that chamber as a contiguous mass and are removed therefrom through pebble outlet conduit 39 and are gravitated into the reaction chamber formed within the smaller diameter portion of shell 38. The pebbles gravitate downwardly over and around Venturi-type member 42 into the reaction chamber portion formed within the larger diameter section of shell 38 and pass downwardly therethrough as a contiguous pebble mass. The pebbles are removed from the bottom portion of shell 38 through pebble outlet conduit 18 and are elevated to the upper end portion of inlet conduit 16 through elevator 19. Heating material is introduced into the lower portion of pebble heater chamber 41 through inlet conduit 31 and the pebbles are heated thereby as described above in connection with Figure 1. Gaseous effluent is removed from the upper portion of pebble heater chamber 41 through effluent outlet conduit 15. Reactant materials are introduced into the lower portion of reaction chamber 37 through inlet conduit 22 and header member 23. The reactant materials pass upwardly through the mass of hot gravitating pebbles and are reacted in the manner discussed in connection with Figure 1 of the drawings. The reaction products and unreacted materials pass into Venturi-type member 42 and are removed from the reaction chamber through effluent outlet conduits 43 and header member 44. The Venturi-type member 42 of this device has been shown without the perforate screen in its lower end portion for the reason that the skirt at the lower end of that Venturi member has been extended downwardly so as to provide a relatively large space between the top of the pebble bed and the constricted portion of the Venturi-type member. As pointed out above, Venturi-type member 24 can be modified so as to remove the perforate member from its lower end portion and the upright extension 28 can be extended downwardly so as to provide this increased space between the top of the pebble bed and the constricted portion of that venturi.

Many modifications of this invention will be apparent to those skilled in the art upon study of the accompanying disclosure and the drawings. It is believed that such modifications are within the spirit and scope of this disclosure.

I claim:

1. An improved pebble heat exchange chamber comprising a closed upright elongated outer shell; pebble inlet means in the upper end portion of said shell; pebble outlet means in the bottom end portion of said shell; fluid inlet means in the lower end portion of said shell; an elongated Venturi member considerably smaller in diameter than said shell, coaxially positioned within the upper end portion of said shell so as to form an annular chamber between said shell and said Venturi member; an extension extending upwardly from the lower end portion of said venturi; an annular arch extending from the upper end portion of said extension to said venturi, said arch being provided with perforations distributed over its surface of sufficient size to permit gas flow therethrough but to exclude flow of pebbles therethrough; said extension and said arch forming an annular distribution chamber around the lower end portion of said Venturi member; fluid inlet conduit means extending through said shell and into said distribution chamber; gaseous effluent conduit means extending between the upper portion of said Venturi member and the exterior of said shell; gaseous effluent conduit means in the upper end portion of said shell; and elevator means extending between said pebble outlet means and said pebble inlet means.

2. The chamber of claim 1, wherein at least two extension members extend between said shell and said distribution chamber forming support members for said distribution chamber.

3. The chamber of claim 1, wherein said pebble inlet means extends to a plurality of points within said annular chamber between said shell and said Venturi member and to a level immediately below that of said gaseous effluent conduit means from said Venturi member.

4. The chamber of claim 3, wherein seal gas inlet means are provided in said shell so as to communicate with said pebble passage between said gas distribution chamber and said shell.

5. The chamber of claim 4, wherein a perforate baffle member is provided in the lower end portion of said Venturi member so as to exclude pebbles from said Venturi member but allow gas flow therethrough.

6. An improved pebble heat exchanger comprising a closed shell; pebble inlet means in the upper end portion of said shell; pebble outlet means in the bottom end portion of said shell; fluid inlet means in the lower end portion of said shell; a Venturi member disposed within the upper end portion of said shell forming an annular chamber between said shell and said Venturi member; said venturi and said shell being proportioned to provide said annular chamber and to provide below said Venturi member a substantial section within said shell, within which a reaction, forming gaseous reaction products, can be effected; said venturi being adapted to be the sole gaseous reaction effluent collecting means within said shell and to collect gaseous reactants from said section below said venturi; said venturi from its lower end being progressively smaller in cross-section to an intermediate portion and from said intermediate portion being progressively larger in cross-section to its upper end, thus having a lower flared portion, a constricted portion, and an upper portion flaring outwardly to its end; said venturi being closed at its upper end within said shell; a gaseous reaction effluent conduit means communicating with and extending laterally from said upper enlarged and closed flaring portion of said venturi and also communicating with the exterior of said shell.

7. An improved pebble heater assembly comprising in combination a first shell; pebble inlet means in the upper end portion of said shell; gaseous effluent conduit means in the upper end portion of said shell; fluid inlet means in the lower end portion of said shell; a second shell below said first-mentioned shell; a pebble conduit extending between the lower end portion of said first-mentioned shell and the upper end portion of said second shell; pebble outlet means in the lower end portion of said second shell; elevator means extending between said pebble outlet means from said second shell to the pebble inlet means in the first-mentioned shell; a Venturi member disposed within the upper end portion of said second shell forming an annular chamber between said second shell and said Venturi member; said venturi and said second shell being proportioned to provide said annular chamber and to provide below said Venturi member a substantial section within said second shell, within which a reaction forming gaseous reaction products can be effected; said venturi being adapted to be the sole gaseous reaction effluent collecting means within said second shell and to collect gaseous reactants from said section below said venturi; said venturi from its lower end being progressively smaller in cross-section to an intermediate portion and from said intermediate portion being progressively larger in cross-section to its upper end, thus having a lower flared portion, a constricted portion, and an upper portion flaring outwardly to its end; said venturi being closed at its upper end within said second shell; a gaseous reaction effluent conduit means communicating with and extending laterally from said upper enlarged and closed flaring portion of said venturi and also communicating with the exterior of said second shell.

ROBERT L. McINTIRE.

References Cited in the file of this patent

UNITED STATES PATENTS

| Number | Name | Date |
| --- | --- | --- |
| 2,398,954 | Odell | Apr. 23, 1946 |
| 2,436,254 | Eastwood et al. | Feb. 17, 1948 |
| 2,505,257 | Quigg | Apr. 25, 1950 |
| 2,512,442 | Norton, Jr. | June 20, 1950 |